INVENTOR.
Joseph A. Fredericks,
BY
Eseler & Leonard,
his ATTORNEYS.

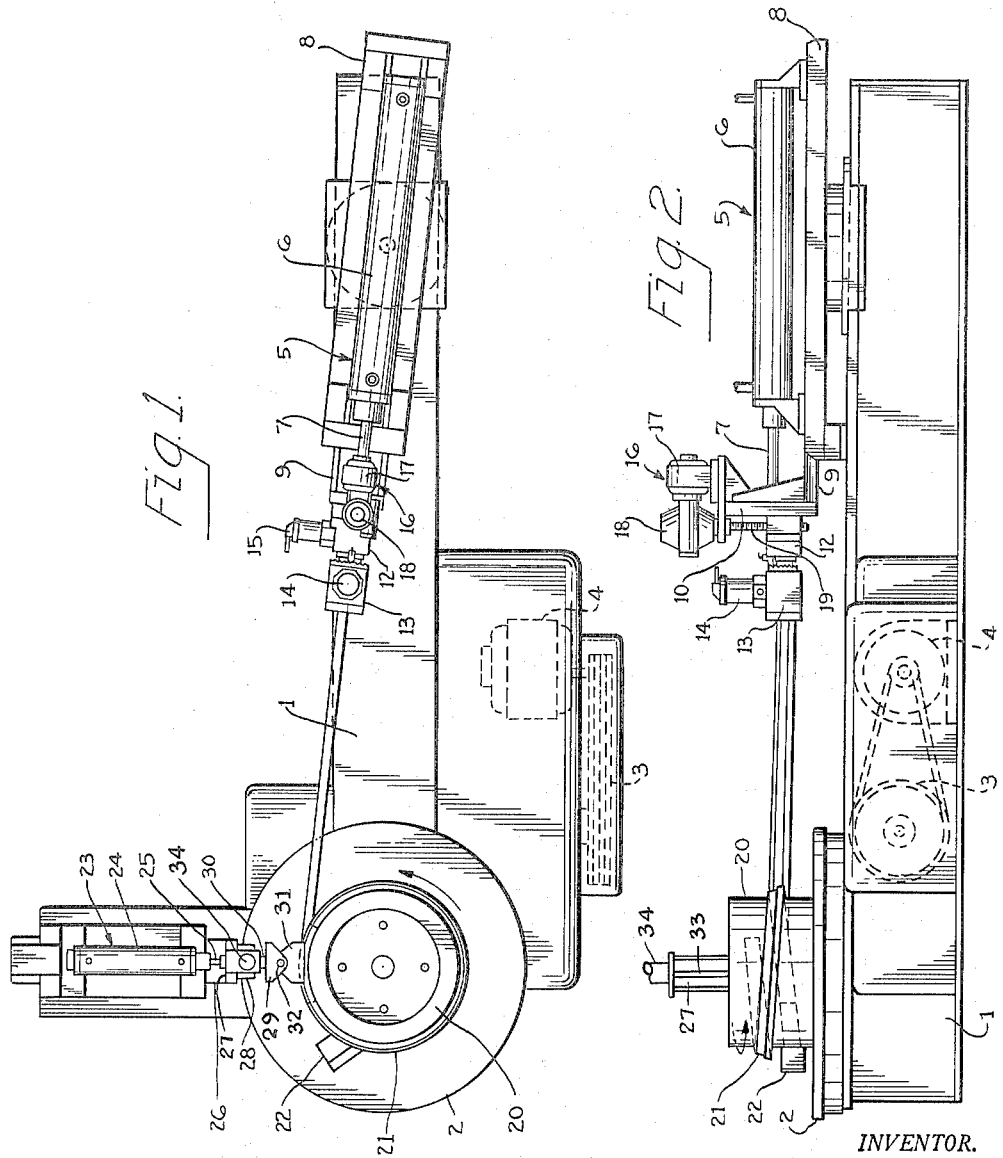

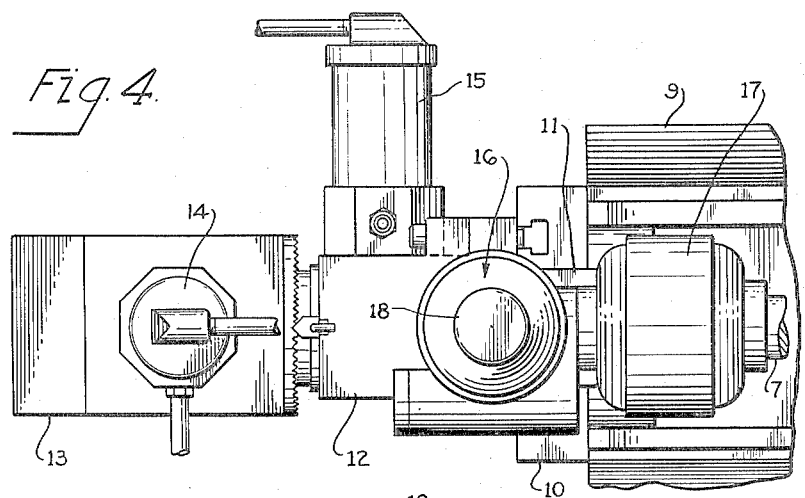
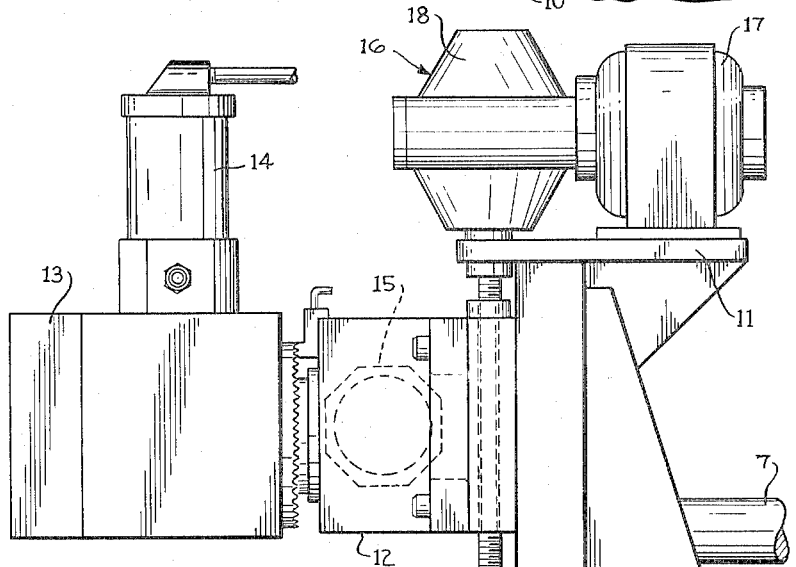
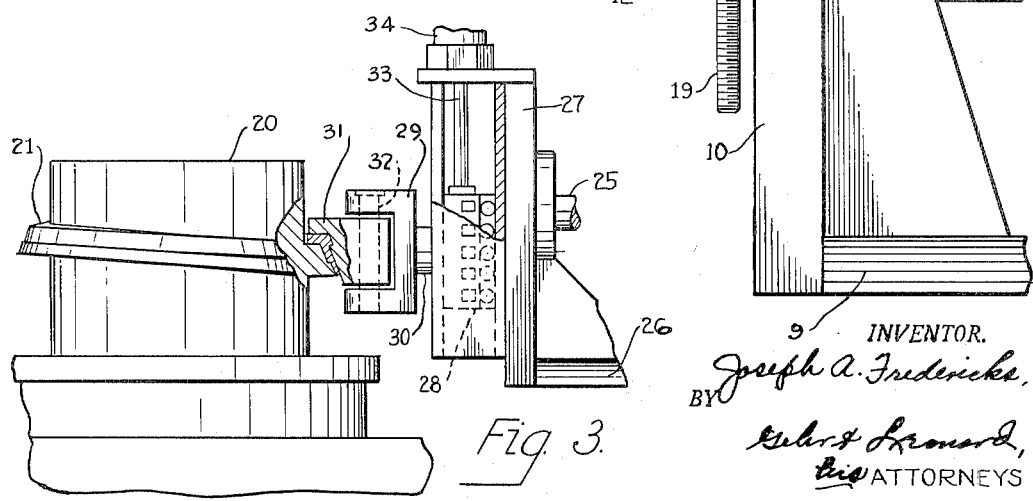

United States Patent Office 2,743,756
Patented May 1, 1956

2,743,756

METHOD OF FORMING STRIP METAL STOCK INTO SHAPES FOR MAKING ANNULAR MEMBERS

Joseph A. Fredericks, Parma, Ohio, assignor to The Cyril Bath Company, Cleveland, Ohio, a corporation of Ohio Application July 20, 1953, Serial No. 368,879

2 Claims. (Cl. 153—40)

This invention relates to a method and apparatus for forming lengths of metal stock, such as planar and flanged strips, rods, bars, tubes and the like, into spiral shapes with the metal so stressed internally that it tends to assume a non-spiral and true annular shape as a result of which, if the end portions of the spiral are cut off so as to leave a length of formed stock which is 360° in extent the internal stresses of the resultant length relieve themselves by twisting the stock in a manner to move the exposed end surfaces substantially into face to face alignment with each other.

The present invention is an improvement on a method and apparatus disclosed in United States Letters Patent No. 2,514,830, of Cyril J. Bath, issued July 11, 1950 and in his copending application Serial No. 262,016, filed December 15, 1951 now Patent No. 2,713,376, issued July 19, 1955.

In the above identified patent, apparatus for effecting concurrent wipe forming and stretch forming operations is disclosed. That apparatus comprises broadly a horizontal turntable supporting a side face die with means for clamping one end of a length of metal stock in fixed position relative to the die, a stretch forming head adapted to be clamped to the other end of the length of stock to be formed and operated by the application of yielding pressure applied by a stretch forming piston and cylinder assemblage to exert an endwise pull on the stock while it is wrapped about the die by rotation of the turntable, and a wipe forming shoe which, by means of a wipe forming piston and cylinder assemblage spaced circumferentially of the table from the stretch forming piston and cylinder assemblage, is applied under yielding pressure to the length of stock being formed about the side face of the die substantially at the instantaneous point of tangency of the stock and die concurrently with the stretch forming operation.

In his above copending application, there is illustrated a similar apparatus in which the die has a spiral working side face and in which the wiping shoe is arranged so as to engage the die, or some suitable guiding means thereon, and thus be lifted and lowered to accommodate itself to the elevation of the instantaneous line of contact of the spiral face with the wiping shoe. The wiping shoe also is arranged so that it can rock about a vertical axis and about an axis extending parallel to the axis of its operating piston and cylinder assemblage.

The stretch forming shoe likewise is provided with means for adjusting it to different vertical positions while permitting it to rock about a horizontal axis parallel to the piston axis.

The apparatus thus described is arranged for concurrent wipe forming and stretch forming lengths of stock into spiral shape of something more than 360° in extent so that the excess end portions of the stock can be severed, leaving a spiral portion of 360° in extent so formed that the end faces can be sprung transversely of the length of the stock and brought together in face to face alignment to provide a somewhat "planar" or "non-spiral" annulus.

In accordance with the present invention, means are provided for maintaining the height of the stretch forming head of such apparatus in a predetermined relation to the height of the spiral at the instantaneous point of tangency so as to set up in the metal during the concurrent wipe forming and stretch forming internal stresses distributed throughout the length of the stock and such as to urge the ends of the formed stock toward each other in a direction parallel to the axis of the spiral, as a result of which, upon cutting off of the excess end portions of the stock so as to leave a length which is 360° in extent, the resultant end faces are moved naturally by the internal stresses into face to face alignment with each other, thus providing, upon welding the end faces together, a generally "planar" or "non-spiral" annulus which is more accurate than those produced by the method and apparatus of my copending application.

Other objects and advantages will become apparent from the following description wherein reference is made to the drawings, in which:

Figures 1 and 2 are a top plan view and a front elevation, respectively, of apparatus embodying the principles of the present invention;

Figure 3 is an enlarged fragmentary elevational view, partly in section, illustrating the wipe forming shoe and mounting of the present invention;

Figures 4 and 5 are a top plan view and a side elevation, respectively, of the stretch forming head and control means of the present invention;

Figure 6:
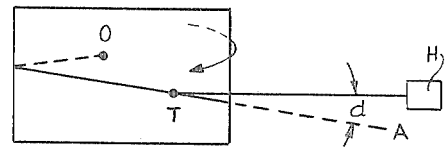
Figures 6 and 7 are diagrammatic illustrations illustrating the manner in which the apparatus can be used in forming the internally stressed spiral shapes of the present invention.

Referring to the drawings, the machine comprises a frame 1 on which a turntable 2 is mounted for rotation about an upright axis, the turntable being driven through power transmission mechanism, indicated at 3, by means of a motor 4.

Mounted on the frame is a stretch forming piston and cylinder assemblage, indicated generally at 5, and comprising a cylinder 6 and piston having a rod 7. The assemblage 5 is mounted on a platform 8 which is arranged for swing about an upright axis and which is provided with a suitable guideway in which a carriage 9 is mounted for reciprocation parallel to the axis of the piston rod 7. Mounted on the front of the carriage 9 is a pedestal 10 on which is a top platform 11. The pedestal 10 has a suitable vertical guideway in which is mounted a stretch forming head carrier 12.

Mounted on the carrier 12 for rotation about an axis parallel to the piston axis is a stretch forming head 13 which is arranged with suitable jaws, not shown, operated by a pneumatic piston and cylinder assemblage 14 for gripping the end of a piece of stock to be stretch formed.

Another pneumatic piston and cylinder assemblage 15 is provided for rocking the head about an axis parallel to the piston axis, but if desired, the assemblage 15 may be left idle so that the head can rock independently of the piston and cylinder assemblage 15. The details of the structure thus far described are fully disclosed in my above identified copending application.

In accordance with the present invention, there is provided on the platform 11 a control device, indicated generally at 16, for controlling the vertical component movement of the head 13 in relation to the elevation of the instantaneous point of tangency of the die and stock being formed.

In the form illustrated, the control device comprises an electric motor 17 and a change speed power transmission mechanism 18 connected to the motor so as to be driven thereby and in turn drivingly connected to an elevating screw 19. Either the motor or the transmission mechanism may be reversible.

The carrier 12 is connected to the screw so as to be moved by the screw to different positions vertically along the guideway 10.

Mounted on the turntable 2 is a side face die 20 having a spiral working face 21 which is slightly more than 360° in extent, for example, about 370° about the axis of the die.

The die 20 is provided with a suitable anchor 22 adapted to be connected to one end of a length of stock to be formed and hold the stock in fixed position relative to the die at the starting point of the stock. Thus, a length of stock may be connected at one end by a clamp 22 in fixed position relative to the spiral face 21 of the die and at the opposite end to the head 13 of the stretch forming piston and cylinder assemblage 5. Thereby, upon rotation of the turntable 2 and admission of pressure fluid into the front portion of the cylinder 6, the stock can be held yieldably under endwise tension sufficient to stretch it as it is wrapped onto the die 20. Since the assemblage is mounted on a platform 8 which can swing about an upright axis, the assemblage aligns itself automatically with the point of tangency of the stock and die. Mounted in fixed position on the frame 1 with its axis angularly disposed circumferentially of the turntable 2 from the axis of the assemblage 5 is a wipe forming piston and cylinder assemblage 23 comprising a cylinder 24 and piston having a rod 25 with the piston axis extending generally horizontally and toward and awayy from the axis of the turntable 2. A reciprocating carriage 26 is mounted on the frame for reciprocation parallel to the axis of the piston rod 25. The forward end of the carriage 26 is provided with an upright pedestal 27 having a vertical guideway in which a wipe shoe carrier 28 is mounted for vertical movement. On the carrier 28 is a yoke 29 which is supported by means of a shaft 30. The shaft 30 extends parallel to the axis of the piston rod 25 and supports the yoke for rocking movement about the shaft axis. A wipe shoe 31 is connected to the yoke 29 by an upright pivot 32 which connects the shoe to the yoke for swinging movement about the axis of the pivot 32. The axis of the pivot 32 lies in a plane at right angles to the axis of the shaft 30. The carriage 28 is arranged for relatively free floating movement in its guideway and is connected by means of a rod 33 to a suitable dash pot or pneumatic piston and cylinder assemblage 34 which can be arranged to normally yieldably hold the carriage at the desired level along its path of movement in the guideway of the pedestal 27.

By proper setting of te adjustable transmission mechanism, the elevation of the stretching head 13 may be maintained in the desired relation to the elevation of the instantaneous point of tangency of the stock and side face die. As hereinbefore mentioned, it is necessary in order to provide a precise annulus that the spirally formed length of stock be made so that it has internal stresses tending to twist it slightly with a distributed twist such that its free ends will swing generally parallel to the axis of the spiral toward each other when the excess metal beyond a 360° extent of the formed spiral length is cut off.

I have found that this stress can be imparted to the metal during the concurrent wipe forming and stretch forming operation by maintaining the portion of the length of stock extending from the instantaneous point of tangency to the stretch forming head 13 deflected from the slope line, at the instantaneous point of tangency, of the trailing portion of the spiral in a direction toward the level of the starting or anchored end of the stock. In general, I have found it satisfactory to maintain the head 13 at elevations such that the stock is substantially horizontal from the instantaneous point of tangency to the stretching head 13 at all times during the forming operation.

It is difficult to determine exactly what internal stresses this action sets up in the metal, but if a spiral length of about 370° to a 380° in extent is formed, it will be found that the end portions are sprung into resilient pressure contact with each other in a direction generally parallel to the axis of the spiral, as illustrated in Figure 10, and that upon severing these end portions so as to leave a length of spiral which is 360° in extent, the metal of the spiral will continue to twist and dispose the end surfaces substantially in alignment with each other peripherally of the axis.

For example, as illustrated in Figures 6 through 9, the four generally used forming operations are illustrated, it being assumed in all cases, that the wipe forming operation is performed concurrently with the stretch forming operation and at, or substantially at, the instantaneous point of tangency of the stock and the die.

Referring first to Figure 6, it is assumed that the die is rotated so that its forward face is travelling away from the stretch head H, as indicated by the arrow. The stock has been clamped to the die at point O, the instantaneous point of tangency is at T, and the stretch head is indicated at H. Thus, the stock is being wrapped onto the spiral die beginning at O, which is at the upper end of the spiral. The slope of the trailing portion of spiral at the point T is indicated by the line AT. The line of pull on the stock imparted by the head 13 is indicated by the line HT. Thus, the angle of deflection "$d$" of the length of stock extending from the point T to the head H from the line AT is upwardly, and in a direction toward the level of the starting point O of the stock.

Figure 7:
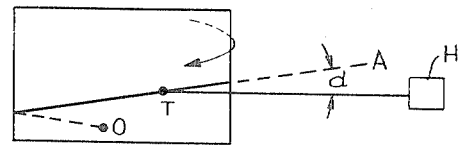

In Figure 7, a similar operation is illustrated except that the starting point O of the stock is at the bottom of the spiral and the stock is wound upwardly of the spiral. In this instance, the deflection "$d$" of the line HT is downwardly from the line AT which is the slope of the trailing portion of the spiral at the point of tangency, but thus again, the deflection "$d$" is a direction toward the level of the starting end of the stock.

It will be seen in both instances, that the deflection "$d$" from the line of slope AT of the trailing portion of the spiral at the instantaneous point of tangency is in a direction toward the level of the starting end of the stock at point O.

Figure 8:
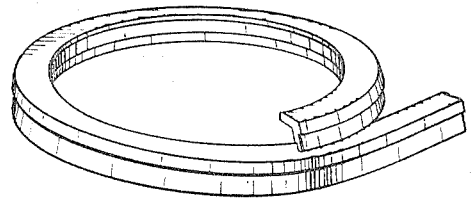
Figure 8 is a perspective view of a piece of flanged stock formed in accordance with the present invention; and, Figure 9 is a fragmentary cross sectional view of a completed annulus formed by removing the excess metal from the stock illustrated in Figure 8 and welding the ends together.

For purposes of illustration, an example of a straight extruded length of metal stock formed in this manner is illustrated in Figure 8, the metal being a magnesium-aluminum alloy of high tensile strength.

Figure 9:
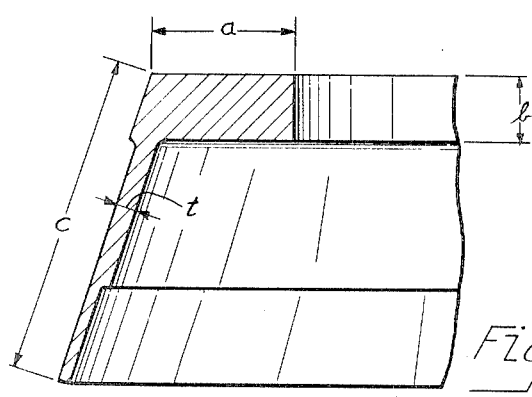

In order to appreciate some of the problems involved, certain dimensions of a piece are indicated by the letters $a$, $b$, $c$, and $t$ in Figure 9, the dimension "$a$" being about 1.15"; "$b$" about 0.50"; "$c$" about 2.40" and "$t$" about 0.12". It has been found that the parts of the stock may be thus formed while retained at substantially its original cross section.

In the description and claims, the formation of the stock is described as spiral but this term is used in a broad sense in that the stock does not have to be a true spiral or helix but is one which is wrapped so that its ends are offset axially of the die. It may be of continuous uniform slope and of uniform diameter or of a varying slope or varying diameter at different portions throughout its length.

Furthermore, throughout the specification and claims, the various parts of the apparatus have been described with relation to the vertical and horizontal but these terms are to be taken only in their relative sense for convenience in description. Obviously, the position of the parts relative to the horizontal and vertical is immaterial so long as the relation of the parts to each other is as described.

Having thus described my invention, I claim:

1. The method of forming strip metal stock into spiral shape comprising laying a length of strip metal stock, progressively from one end of the length to the other end of the length, generally flatwise against a spiral forming surface while exerting an endwise pull on the length of stock at said other end so as to stretch form the length of stock against said surface, concurrently wipe forming the length of stock against said surface and, during the forming operations, maintaining the line of pull on the unwrapped portion of the length of stock deflected generally edgewise of the stock from the slope line of the trailing portion of the spiral surface at the instantaneous point of tangency in a direction toward the level of said one end sufficiently to provide a uniformly distributed internal stress in the spirally formed strip operative to urge the strip to twist slightly throughout its length in a direction to cause the ends of the spirally formed portion to swing toward each other endwise of the spiral, controlling the amount of said deflection and thereby said internal stress so that the internal stress is just sufficient so that, if the end portions of the stock are cut off so as to relieve a single complete spiral turn, the severed ends of said complete turn will be caused to swing by said internal stress into alignment with each other in a direction circumferentially of the spiral.

2. The method according to claim 1 characterized in that the wipe forming is effected substantially at the instantaneous point of tangency of the stock and said surface, the line of pull upon the stock is maintained substantially through the instantaneous point of tangency and in a plane which is substantially at right angles to the axis of the spiral, and the pitch of the spiral is at least greater than, but close to, the distance between the opposite edges of the formed spiral stock measured parallel to the axis of the spiral.

References Cited in the file of this patent

UNITED STATES PATENTS

| | | |
|---|---|---|
| 210,873 | Nichols | Dec. 17, 1878 |
| 1,358,938 | Danglemeyer | Nov. 16, 1920 |
| 1,604,172 | Klinkmann | Oct. 26, 1926 |
| 1,915,312 | Hauf | June 27, 1933 |
| 2,054,196 | Gogan | Sept. 15, 1936 |
| 2,143,707 | Monahan | Jan. 10, 1939 |
| 2,371,107 | Mapes | Mar. 6, 1945 |
| 2,412,731 | Hoffman | Dec. 17, 1946 |
| 2,514,830 | Bath | July 11, 1950 |

OTHER REFERENCES

American Machinist (a reprint from July 24, 1950 issue) entitled Production Tools Bend Tubing, by H. M Williams.